(No Model.)
H. J. RICHARDSON.
VEHICLE GEAR.
No. 426,329. Patented Apr. 22, 1890.
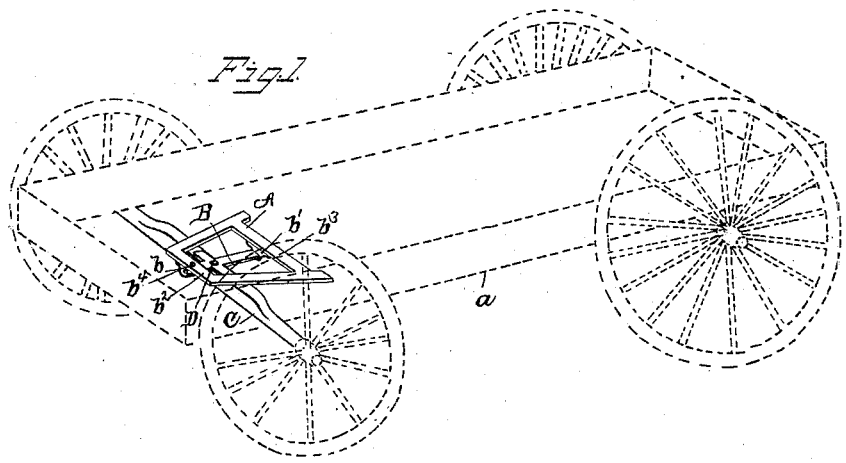
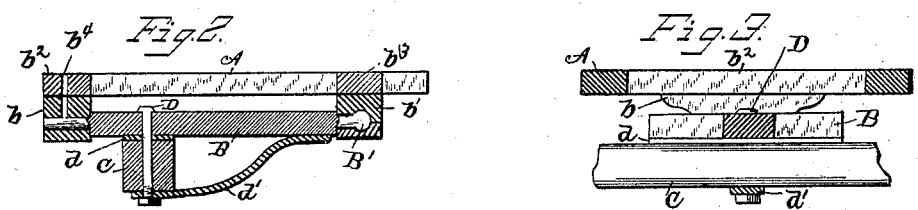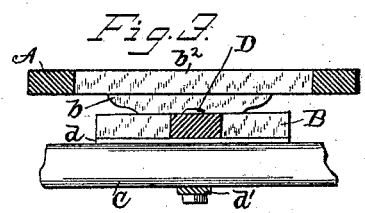
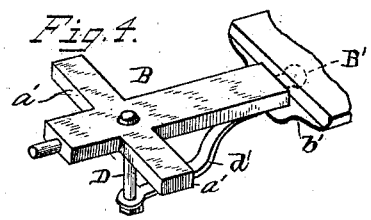
Witnesses.
Wm. S. Hodges
Robert Jenning
Inventor.
Harvey J. Richardson,
By
Samuel D. Truitt,
Attorney.

UNITED STATES PATENT OFFICE.

HARVEY JONES RICHARDSON, OF NEW WESTON, OHIO.

VEHICLE-GEAR.

SPECIFICATION forming part of Letters Patent No. 426,329, dated April 22, 1890.

Application filed December 19, 1889. Serial No. 334,259. (No model.)

*To all whom it may concern:*

Be it known that I, HARVEY JONES RICHARDSON, a citizen of the United States of America, residing at New Weston, in the county of Darke and State of Ohio, have invented certain new and useful Improvements in Vehicle-Gears, of which the following is a specification, reference being had therein to the accompanying drawings.

This invention pertains to certain new and useful improvements in vehicle-gear, having for its object the provision of new and improved means whereby the front wheels and axle of a wagon or other vehicle can assume any angular position and conform to inequalities and unevenness in the road, the vehicle-body always remaining in the same horizontal position.

The invention comprises the detail construction, combination, and arrangement of parts, substantially as hereinafter fully set forth, and particularly pointed out in the claim.

In the accompanying drawings, Figure 1 is a perspective view showing my invention applied to a vehicle-body, the latter being in dotted lines. Fig. 2 is a vertical longitudinal sectional view. Fig. 3 is a transverse sectional view. Fig. 4 is a view of the +-shaped bar or swivel connection.

Referring to the drawings, A designates a frame, preferably of triangular shape, which is secured to the under side of the wagon-body $a$.

B is a +-shaped bar provided with lateral arms $a'$ and having its ends secured in boxes $b\ b'$, attached to the under side of the front and rear bars $b^2\ b^3$ of frame A. The box $b'$ is preferably made in sections, to secure the ball end B' of bar B. A hole or opening $b^4$ is formed in bar $b^2$, through which lubricant can be supplied to the front end of bar B.

C is the axle, which is provided with a central bearing-plate $d$, through an aperture of which and of the bar B is passed a king-bolt D. A brace-arm $d'$, rigidly secured at its rear end to bar B, is passed beneath axle C to form a support therefor, and through an aperture thereof the king-bolt D is also passed.

It will be seen that by means of the above construction I have produced a swivel connection or coupling between the front axle and vehicle-body, and that by means of the king-bolt said axle has a lateral movement, while by the +-shaped bar B, to which said axle is connected, the latter has an up-and-down movement, the ends of said bar being pivotally connected to the frame A.

My invention is extremely simple, comprising, as it does, but few parts, and the latter are durable and not likely to readily get out of order or become deranged.

To those experienced in the art it will be apparent that by means of my invention the body of a vehicle will always remain horizontal; that the strain is removed from the king-bolt and body, since the axle, the pivoted bar, and the lower brace always move simultaneously, and that a uniform bearing on the springs is always obtained.

I claim as my invention—

The combination, with a vehicle-body and its axle, of the frame herein described, secured to said body and having its front cross-bar provided with an aperture $b^4$, the journal-boxes secured to the front and rear cross-bars of said frame, one of which boxes is formed in sections, the bar B, having its ends secured in said journal-boxes and provided with short lateral arms bearing on said axle, the king-bolt, and the arm $d'$, secured to said bar B and held beneath said axle by said king-bolt, substantially as set forth.

In testimony whereof I affix my signature in presence of two witnesses.

HARVEY JONES RICHARDSON.

Witnesses:
ELIJAH CURTIS,
J. A. MUSSULMAN.